(12) United States Patent
Sawai et al.

(10) Patent No.: US 9,660,269 B2
(45) Date of Patent: May 23, 2017

(54) ELECTRODE FOR LITHIUM SECONDARY BATTERY AND LITHIUM SECONDARY BATTERY

(71) Applicant: SEI Corporation, Mie (JP)

(72) Inventors: Takehiko Sawai, Mie (JP); Shinji Saito, Mie (JP); Kazuma Hanai, Mie (JP)

(73) Assignee: SEI CORPORATION, Mie (JP)

( * ) Notice: Subject to any disclaimer, the term of this patent is extended or adjusted under 35 U.S.C. 154(b) by 0 days.

(21) Appl. No.: 14/441,845

(22) PCT Filed: Jan. 16, 2013

(86) PCT No.: PCT/JP2013/050674
§ 371 (c)(1),
(2) Date: May 9, 2015

(87) PCT Pub. No.: WO2014/073221
PCT Pub. Date: May 15, 2014

(65) Prior Publication Data
US 2015/0295240 A1 Oct. 15, 2015

(30) Foreign Application Priority Data

Nov. 9, 2012 (JP) .................................. 2012-246967

(51) Int. Cl.
*H01M 4/583* (2010.01)
*H01M 4/70* (2006.01)
(Continued)

(52) U.S. Cl.
CPC ............ *H01M 4/583* (2013.01); *H01M 4/133* (2013.01); *H01M 4/366* (2013.01); *H01M 4/587* (2013.01);
(Continued)

(58) Field of Classification Search
CPC .. H01M 4/583; H01M 10/04; H01M 10/0525; H01M 4/70; H01M 4/133;
(Continued)

(56) References Cited

U.S. PATENT DOCUMENTS

| 6,027,833 | A | 2/2000 | Ueda |
| 6,356,432 | B1 | 3/2002 | Danel |

(Continued)

FOREIGN PATENT DOCUMENTS

| CN | 1790799 | * | 6/2006 |
| CN | 101271972 A | | 9/2008 |

(Continued)

OTHER PUBLICATIONS

JP2008-311171MT.*

(Continued)

*Primary Examiner* — Alex Usyatinsky
(74) *Attorney, Agent, or Firm* — Hedman & Costigan, P.C.; James V. Costigan; Kathleen A. Costigan

(57) ABSTRACT

The present invention provides positive and negative electrodes, for a lithium secondary battery, allowing a battery to be quickly and fully charged in a very short period of time, for example, within one minute and allowing the battery to be used for vehicles at low temperatures. An organic electrolytic solution is permeated into an electrode group formed by winding positive and negative electrodes or by laminating the positive and negative electrodes one upon another with a separator being interposed therebetween to repeatingly occlude and release lithium ions. The positive electrode active substance and the negative electrode active substance have at least one phase selected from among a graphene phase and an amorphous phase as a surface layer thereof. An activated carbon layer is formed on a surface of (Continued)

the positive electrode active substance and that of the negative electrode active substance.

4 Claims, 1 Drawing Sheet

(51) Int. Cl.
*H01M 4/133* (2010.01)
*H01M 4/36* (2006.01)
*H01M 4/587* (2010.01)
*H01M 10/04* (2006.01)
*H01M 10/0525* (2010.01)
H01M 10/052 (2010.01)

(52) U.S. Cl.
CPC ......... *H01M 4/70* (2013.01); *H01M 10/0431* (2013.01); *H01M 10/0525* (2013.01); *H01M 10/052* (2013.01); *H01M 2220/20* (2013.01); *Y02E 60/122* (2013.01)

(58) Field of Classification Search
CPC ........ H01M 4/366; H01M 4/587; H01M 4/36; H01M 4/62; H01M 10/0431; H01M 4/13
See application file for complete search history.

(56) References Cited

U.S. PATENT DOCUMENTS

| | | | |
|---|---|---|---|
| 6,444,366 B1 | 9/2002 | Kawano | |
| 2006/0134527 A1* | 6/2006 | Amine | H01M 4/13 429/326 |
| 2007/0002523 A1* | 1/2007 | Ando | H01G 9/016 361/503 |
| 2009/0075161 A1* | 3/2009 | Ando | H01M 4/13 429/94 |
| 2009/0148759 A1* | 6/2009 | Mitsuda | H01G 9/058 429/142 |
| 2012/0034522 A1* | 2/2012 | Sheem | H01M 4/13 429/213 |
| 2012/0052400 A1 | 3/2012 | Kim | |
| 2012/0088129 A1* | 4/2012 | Kaneda | H01M 4/131 429/59 |
| 2012/0134072 A1* | 5/2012 | Bae | H01G 11/28 361/502 |

FOREIGN PATENT DOCUMENTS

| | | | |
|---|---|---|---|
| CN | 101394002 A | | 3/2009 |
| CN | 101807683 | * | 8/2010 |
| CN | 101807683 A | | 8/2010 |
| CN | 102244231 A | | 11/2011 |
| CN | 102473984 A | | 5/2012 |
| EP | 2040320 A1 | | 3/2009 |
| EP | 2429020 A1 | | 3/2012 |
| JP | 11-283623 A | | 10/1999 |
| JP | 2001-143691 A | | 5/2001 |
| JP | 2001-351688 A | | 12/2001 |
| JP | 2007-280803 A | | 10/2007 |
| JP | 2007280803 | * | 10/2007 |
| JP | 2008-311171 A | | 12/2008 |
| JP | 2009-070782 A | | 4/2009 |
| JP | 2011-049079 A | | 3/2011 |
| JP | 2013-030275 A | | 2/2013 |
| KR | 10-2009-0029624 A | | 3/2009 |
| WO | 2011/049153 A1 | | 4/2011 |
| WO | 2012/137572 A1 | | 10/2012 |

OTHER PUBLICATIONS

CN1790799MT.*
JP 2007-280803MT.*
EP13852725,European_search_opinion,May 12, 2016.*
CN101807683 MT.*
JP 2007280803 MT.*
International Search Report in corresponding application dated Mar. 5, 2013.
Supplementary European Search Report dated May 4, 2016.
Search Report from corresponding Taiwanese Application Serial No. 102118800 dated Jun. 1, 2016.
English Abstract of CN101807683A dated Aug. 18, 2010.
References in Chinese Patent Office in corresponding application dated Sep. 19, 2016.

* cited by examiner

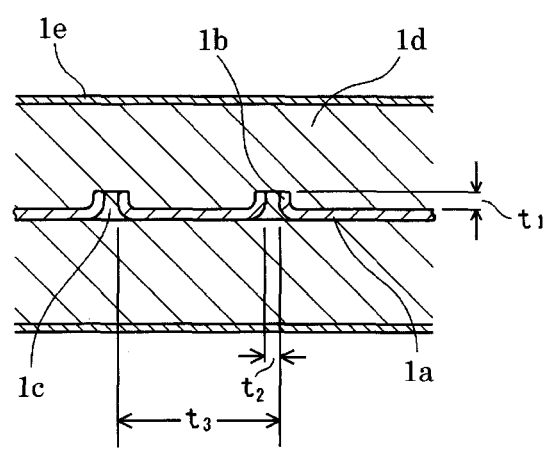

ELECTRODE FOR LITHIUM SECONDARY BATTERY AND LITHIUM SECONDARY BATTERY

TECHNICAL FIELD

The present invention relates to an electrode for a lithium secondary battery and the lithium secondary battery using the electrode.

BACKGROUND ART

The lithium secondary battery whose negative electrode is formed by using a material capable of occluding and releasing lithium ions is capable of restraining the precipitation of dendrite to a higher extent than a lithium battery whose negative electrode is formed by using metallic lithium. Therefore the lithium secondary battery has been supplied to the market as a battery having enhanced safety. In recent years, the lithium secondary battery is developed for driving vehicles. Thus it is a big problem to allow the lithium secondary battery to have energy regeneration, namely, quick charging performance. As a countermeasure for this problem, the following (1) and (2) are considered: (1) decrease of electric resistance of the battery, (2) prevention of precipitation reaction of metallic lithium in intercalation and deintercalation reactions of lithium ions and quick progress of the intercalation and deintercalation reactions. Regarding the above-described (1), to thin positive and negative electrodes and devise the construction of a current collection foil to decrease the electric resistances of the electrodes are proposed (see patent document 1). Further the following proposals are made: to increase the amount of conductive materials inside the electrodes to decrease the electric resistance thereof and to lower the electrical resistance of a separator. Regarding the above-described (2), the following proposals are made: to increase the specific surface area of active substances of positive and negative electrodes, to increase the areas of the electrodes to decrease the density of charging and discharging currents, and to alter the active substance of the negative electrode from a graphite material to an amorphous carbon material or lithium titanate.

These devices make it possible to improve quick charging performance. But the alteration of the negative electrode material of the above-described (2) is disadvantageous in allowing the battery to have high capacity. To use the battery for vehicles, a little improvement of the performance thereof is insufficient, but there is a demand for the development of the battery which can be fully and quickly charged, for example, within one minute. This is because the battery for use in vehicles is desired to have a large or high capacity to gain distance to electrically drive vehicles. But as a result of an increase in the weight of the battery, it is difficult to improve the travel distance of vehicles. To solve the problem, by improving the regenerative performance of the battery to a high extent without increasing the capacity thereof and by fully charging the battery within one minute, the vehicle can be electrically driven when the battery can be regenerated in a very short period of time, even though the capacity thereof is exhausted owing to discharge. In the case where the battery can be fully charged within one minute it is possible to instantaneously charge the battery of electric cars at a charging station, which is very advantageous.

PRIOR ART DOCUMENT

Patent Document

Patent document 1: International Publication No. WO2011/049153

SUMMARY OF THE INVENTION

Problem to be Solved by the Invention

The present invention has been made to cope with the above-described problems. It is an object of the present invention to provide positive and negative electrodes, for a lithium secondary battery, allowing a battery to be quickly and fully charged in a very short period of time, for example, within one minute and allowing the battery to be used to drive vehicles at low temperatures and the lithium secondary battery using the positive and negative electrodes.

Means for Solving the Problem

The present invention provides an electrode for a lithium secondary battery in which an organic electrolytic solution is permeated into an electrode group formed by winding positive and negative electrodes or by laminating the positive and negative electrodes one upon another with a separator being interposed therebetween to repeatedly occlude and release lithium ions.

In the electrode for the lithium secondary battery, the positive electrode is composed of a positive electrode current collection foil and a positive electrode active substance formed on the positive electrode current collection foil, and the negative electrode is composed of a negative electrode current collection foil and a negative electrode active substance formed on the negative electrode current collection foil. The active substance forming the positive and negative active substance layers has at least one phase selected from among a graphene phase and an amorphous phase as a surface layer thereof. An activated carbon layer is formed on a surface of each of the positive and negative electrode active substance layers. The specific surface area of the activated carbon is not less than 1000 $m^2/g$.

The positive electrode current collection foil and/or the negative electrode current collection foil constructing the electrode of the present invention for the lithium secondary battery has a plurality of through-holes which penetrate through the positive electrode current collection foil and/or the negative electrode current collection foil and each of which has a projected portion projected from at least one surface of the positive electrode current collection foil and/or the negative electrode current collection foil.

In the lithium secondary battery of the present invention, by using the positive and negative electrodes, an organic electrolytic solution is permeated into an electrode group formed by winding positive and negative electrodes or by laminating the positive and negative electrodes one upon another with a separator being interposed therebetween to repeatedly occlude and discharge lithium ions.

Effect of the Invention

In the electrode of the lithium secondary battery of the present invention, the activated carbon layer having a specific surface area of not less than 1000 $m^2/g$ is formed on the surface of the active substance of each of the positive and negative electrodes. Therefore as compared with an electrode in which the activated carbon layer is not formed, the lithium secondary battery of the present invention can be charged fully in a very short period of time, namely, within one minute. In addition, the lithium secondary battery is capable of preventing metallic lithium dendrite from precipitating on the surface of the active substance of the negative electrode in charging the lithium secondary battery very quickly.

BRIEF DESCRIPTION OF THE DRAWING

FIG. 1 is a sectional view of a negative electrode plate of an embodiment.

MODE FOR CARRYING OUT THE INVENTION

One example of an electrode for use in a lithium secondary battery of the present invention is described below.

FIG. 1 is a sectional view of one negative electrode plate consisting of a foil-like current collector having a plurality of through-holes, formed therethrough, each having a projected portion, an active substance layer, and an activated carbon layer.

A foil-like current collector $1a$ has projected holes $1c$, formed therethrough, each having a projected portion $1b$ formed around the through-hole. An active substance layer $1d$ is formed on both surfaces of the foil-like current collector $1a$. An activated carbon layer $1e$ is formed on both surfaces of the active substance layer $1d$. The activated carbon layer $1e$ may be formed on the entire surface of the active substance layer $1d$ or on a part of the surface thereof.

As an active substance forming the active substance layer $1d$, a carbon material having at least one phase selected from among a graphene phase and an amorphous phase as its surface layer is exemplified.

The projected portion $1b$ and the projected hole $1c$ may be formed on the entire surface of the foil-like current collector or on a part thereof without forming them on a flat foil-like part of the surface thereof. It is preferable to form the projected portion $1b$ and the projected hole $1c$ on a part of surface of the current collector in consideration of the strength of the current collection foil in producing the battery. It is especially preferable not to form the projected hole $1c$ and leave the flat foil-like part at both widthwise ends of the current collection foil.

As the sectional configuration of the projected hole $1c$, it is possible to use pyramidal, cylindrical, conical configurations, and the combination of these configurations. The conical configuration is more favorable than the other configurations in view of a machining speed, the shot life of a machining jig, and the possibility of the generation of chips or peeled powders after the tip portion of the projected hole is machined.

It is preferable to form the projected hole $1c$ as the through-hole by breaking through the current collection foil to improve its current collection effect. The through-hole formed by breaking through the current collection foil allows a lithium secondary battery to have a higher charge and discharge performance and a higher durability against an internal short-circuit and the like at a charge/discharge cycle time than a through-hole formed through the current collection foil by punching processing or irregularities formed thereon by emboss processing.

The through-hole is circular and has a diameter $t_2$ of 50 to 150 μm. A height $t_1$ of the projected portion $1b$ is 50 to 400 μm. A distance $t_3$ between adjacent through-holes is 300 to 2000 μm. By distributing the through-holes in the above-described range, the entire through-hole-formed surfaces receive a contact pressure. Thus when the current collection foil is wound by a winding roll with the through-hole-formed surfaces in direct contact with the winding roll, the through-holes are not closed.

In the negative electrode, the carbon material forming the active substance layer $1d$ has at least one phase selected from among the graphene phase and the amorphous phase as the surface layer thereof. The graphene phase means a planar six-membered ring structure layer of $sp^2$ bonded carbon atoms. The amorphous phase means the three-dimensionally constructed six-membered ring structure.

The carbon material consists of at least one carbon material selected from among a graphite carbon material including artificial graphite, natural graphite, an easily graphitizable carbon material, and an amorphous carbon material; conductive carbon black powder including acetylene black, Ketjen black, and crystalline graphite; and conductive carbon fiber. These carbon materials are much smaller than the activated carbon in the specific surface areas thereof and different from the activated carbon in the properties thereof.

As the graphite carbon material, it is possible to use soft carbon which allows the hexagonal network plane constructed by carbon atoms, namely, the graphite structure where the graphene phases are regularly layered one upon another to be easily developed on the surface thereof.

It is preferable that the conductive carbon fiber contains at least one kind of carbon fiber, graphite fiber, vapor-grown carbon fiber, carbon nanofiber, and carbon nanotube. The diameter of the carbon fiber is favorably 5 nm to 200 nm and more favorably 10 nm to 100 nm. The length thereof is favorably 100 nm to 50 μm and more favorably 1 μm to 30 μm.

Of the above-described carbon materials, as the carbon material for the negative electrode material of the lithium secondary battery, it is preferable to use the conductive carbon powder and the conductive carbon fiber in combination. The mixing ratio therebetween is set to preferably [conductive carbon powder/conductive carbon fiber=(2 to 8)/(1 to 3)] in mass ratio. It is possible to use 1 to 12, preferably at 4 to 8 percentages by mass of a conductive material for the entire negative electrode material.

The activated carbon which can be used in the present invention is obtained by heat-treating carbide produced from sawdust, wood chips, charcoal, coconut shell charcoal, coal, phenol resin or rayon at high temperatures about 1000° C. The activated carbon which can be used in the present invention has a specific surface area favorably not less than 1000 $m^2/g$ and more favorably 1500 to 2200 $m^2/g$. The specific surface area of the activated carbon is measured by using a BET three-point method.

Examples of commercially available products of the activated carbon which can be used in the present invention include activated carbon having a stock number MSP-20N (specific surface area: 2100 $m^2/g$) produced by Kureha Chemical Industry Co., Ltd. and Taiko activated carbon C type (specific surface area: 1680 $m^2/g$) produced by Futamura Chemical Co., Ltd.

As shown in FIG. 1, the activated carbon layer $1e$ is formed on both surfaces of the active substance layer $1d$. The activated carbon layer $1e$ may be formed on the entire surface of the active substance layer $1d$ or on the surface of a part thereof. It is preferable to form the activated carbon layer $1e$ on the entire surface thereof.

The thickness of the activated carbon layer $1e$ is 0.1 to 5 μm and favorably 0.5 to 4 μm. In the case where the thickness of the activated carbon layer 1e is in this range, improved quick charging performance can be achieved.

As methods of forming the activated carbon layer 1e on the active substance layer 1d, an application method using a roll coater or a spray method are exemplified.

The positive electrode of the lithium secondary battery of the present invention consists of an active substance composed of a mixed material layer containing a main material consisting of a lithium-containing metal oxide or its solid solution having a layered structure or a spinel structure, a lithium-containing metal phosphate compound having an olivine structure or fluoride thereof, a lithium-containing metal silicate compound having the olivine structure or fluoride thereof or a lithium-containing sulfur compound; a carbon material layer, similar to that of the above-described negative electrode material, which is formed as the surface layer of the main material; a binder; and a conductive material. The mixed material layer is formed on an aluminum current collection foil having holes each having a projected portion formed therearound similarly to the negative electrode. It is preferable to use the conductive carbon powder and the conductive carbon fiber in combination as the conductive material. The mixing ratio therebetween is set to preferably [conductive carbon powder/conductive carbon fiber=(2 to 8)/(1 to 3) in mass ratio. It is possible to mix 3 to 12, preferably 5 to 10 percentages by mass of the conductive material for the entire positive electrode material. In the present invention, the mixed material containing the main material such as the lithium-containing metal oxide and the conductive material is called a positive electrode active substance. The activated carbon layer similar to that of the negative electrode is formed on the surface of the mixed material layer.

As the lithium-containing metal oxide having the layered structure or the spinel structure, $LiCoO_2$, $Li(Ni/Co/Mn)O_2$, and $LiMn_2O_4$ are exemplified. As the solid solution thereof, $Li_2MnO_3$—$LiMO_2$ (M=Ni, Co, Mn) is exemplified. As the lithium-containing metal phosphate compound, $LiFePO_4$, $LiCoPO_4$, and $LiMnPO_4$ are listed. As the lithium-containing metal silicate compound, $LiFeSiO_4$ is exemplified. As the fluoride, $Li_2FePO_4$. F is exemplified. As the lithium-containing compound, $LiS_4$, $LiTi_2(PO_4)_3$ and $LiFeO_2$ are exemplified.

Of the above-described compounds, it is preferable to use $LiCoO_2$, $Li(Ni/Co/Mn)O_2$, and $LiMn_2O_4$, and $LiFePO_4$ in consideration of the electrochemical property, safety, and cost thereof. It is preferable to form the carbon material layer having at least one phase selected from among the graphene phase and the amorphous phase on the surface of the active substance.

As the conductive material, carbon black and carbon nanotube are exemplified. The activated carbon layer is formed on the surface of mixed material layer of the active substance containing the binder.

A separator which can be used for the lithium secondary battery electrically insulates the positive and negative electrodes from each other and maintains an electrolytic solution. As the separator, it is possible to exemplify a film and fiber made of synthetic resin or an inorganic fiber. As examples of the material for the separator, it is possible to exemplify a polyethylene film and a polypropylene film; woven cloth and nonwoven cloth made of these resins; and glass fiber and cellulose fiber.

As an electrolytic solution of the lithium secondary battery in which the electrode group is immersed, it is preferable to use a nonaqueous electrolytic solution containing lithium salts or an ion-conducting polymer.

Examples of nonaqueous solvents for the nonaqueous electrolytic solution containing the lithium salts include ethylene carbonate (EC), propylene carbonate (PC), diethyl carbonate (DEC), dimethyl carbonate (DMC), and methyl ethyl carbonate (MEC).

As lithium salts which can be dissolved in the nonaqueous solvents, lithium hexafluorophosphate ($LiPF_6$), lithium tetrafluoroborate ($LiBF_4$), and lithium trifluoromethanesulfonate ($LiSO_3CF_4$) are listed.

In the lithium secondary battery, as a binding agent which is a physically and chemically stable in an atmosphere inside the battery, it is possible to use fluorine-containing resin such as polytetrafluoroethylene, polyvinylidene fluoride, and fluororubber; and thermoplastic resin such as polypropylene and polyethylene. It is also possible to use an acrylic resin material and a styrene butadiene material.

EXAMPLES

Electrode examples and battery examples using electrodes produced in the electrode examples are described below.

Electrode Example 1 & Electrode Comparative Example 1

To examine the effect to be brought about by the negative electrode of the present invention, negative electrodes for the lithium secondary battery were produced by using the following method.

One part by mass of a carbon nanotube conductive material was added to a carbon material of the negative electrode material having artificial graphite formed on its surface. As a binder, a styrene butadiene material (SBR) solution was mixed with a carboxymethyl cellulose water (CMC) solution. Three parts by mass (CMC/SBR solid ratio=1/2 parts by mass) of the mixture was added to the carbon material as a solid member of the CMC and the SBR. In this manner, slurry was produced.

After the above-described slurry was applied in an amount of 75 g/m² to a copper foil having a smooth surface not having through-holes formed therethrough, the slurry was dried. As an electrode example 1 of the present invention, a slurry solution containing activated carbon having a specific surface area of 2100 m²/g, a polyvinyl alcohol binder, and carboxymethyl cellulose (CMC) was applied by using a roll to both surfaces of the copper foil to which the slurry was applied in a thickness of 2 μm. Thereafter the slurry solution was dried. Thereafter the slurry-applied copper foil was subjected to pressing processing to obtain the negative electrode for the lithium secondary battery. When the copper foil was subjected to pressing processing, the total thickness thereof was 124 μm. Except that the above-described activated carbon was not applied to the copper foil, the negative electrode of the electrode comparative example 1 having the same construction as that of the negative electrode of the electrode example 1 was produced.

Electrode Example 2

As a foil-like current collector of the negative electrode, a copper foil was prepared. As shown in FIG. 1, a diameter $t_2$ of a through-hole formed therethrough was 100 μm. A height $t_1$ of a projected portion formed thereon is 45 μm. A distance $t_3$ between adjacent through-holes is 300 μm. The thickness of the copper foil was 10 μm. Except that the foil-like current collector was used, the negative electrode of the electrode example 2 having the same construction as that of the negative electrode of the electrode example 1 was produced by using a method similar to that of the electrode example 1.

Electrode Examples 3 and 4

Except that activated carbon having a specific surface area of 1680 m²/g was used, the negative electrode of the electrode example 3 having the same construction as that of the negative electrode of the electrode example 1 was produced by using a method similar to that of the electrode example 1.

Except that activated carbon having a specific surface area of 800 m²/g was used, the negative electrode of the electrode example 4 having the same construction as that of the negative electrode of the electrode example 1 was produced by using a method similar to that of the electrode example 1.

Positive electrodes to be used as the electrodes opposite to the negative electrodes produced in the electrode examples 1, 2, 3, and 4 and the electrode comparative example 1 were produced by using the following method.

As an active substance, olivine type lithium iron phosphate having its surface coated with conductive carbon whose secondary particle diameter was 2 to 3 μm was used. A conductive agent consisting of 10 parts by mass of a mixture of conductive carbon and conductive carbon fiber and a binding agent consisting of six parts by mass of polyvinylidene fluoride were added to 84 parts by mass of the active substance. After a dispersion solvent consisting of N-methylpyrrolidone was added to the mixture, the components were kneaded to produce a positive electrode mixed agent (positive electrode slurry).

Electrode Example 5 & Electrode Comparative Example 2

An aluminum foil having a smooth surface and a thickness of 20 μm and a width of 150 mm was prepared. After the positive electrode slurry was applied to both surfaces of the aluminum foil and dried, the activated carbon slurry used in producing the negative electrode of the electrode example 1 was applied to both surfaces of the aluminum foil to produce the positive electrode for the lithium secondary battery. After the positive electrode slurry was applied to both surfaces of the aluminum foil and dried, the slurry-applied aluminum foil was pressed. As a result, the total thickness of the obtained positive electrode of the electrode example 5 was 160 μm. Except that the above-described activated carbon slurry was not applied to the aluminum foil, the positive electrode of the electrode comparative example 2 having the same construction as that of the positive electrode of the electrode example 5 was produced.

Electrode Example 6

The positive electrode of the electrode example 6 for the lithium secondary battery having an activated carbon layer formed on its surface was produced by using the same method as that of the positive electrode of the electrode example 5 except that an aluminum foil having holes each having a projected portion formed therearound was used as a foil-like current collector of the positive electrode. As shown in FIG. 1, a diameter $t_2$ of a through-hole formed through the aluminum foil was 100 μm. A height $t_1$ of the projected portion formed thereon was 60 μm. A distance $t_3$ between adjacent through-holes was 300 μm. The thickness the aluminum foil was 20 μm.

Electrode Examples 1 Through 5 and Electrode Comparative Example 1

By using the positive electrodes and negative electrodes for the lithium secondary battery produced in the electrode examples and the electrode comparative examples, aluminum laminate film pack type lithium ion batteries of 3.4V-5 Ah were produced. One mol/l of lithium hexafluorophosphate (LiPF$_6$) was dissolved in a solution in which an ethylene carbonate (EC) solvent, a methyl ethyl carbonate (MEC) solvent, and a dimethyl carbonate (DMC) solvent were mixed with one another to prepare an electrolytic solution. As a separator for the positive and negative electrodes, a film made of polyethylene (PE) resin and having a thickness of 40 μm was used.

Table 1 shows the constructions of the electrodes of the electrode examples and those of the electrodes of the electrode comparative examples. Table 2 shows the combinations of the positive and negative electrodes.

TABLE 1

| | kind of electrode | whether through-hole is formed through current collection foil | activated carbon layer formed on electrode surface | |
|---|---|---|---|---|
| | | | whether activated carbon layer is formed | specific surface area (m²/g) |
| electrode example 1 | negative electrode | not formed | formed | 2100 |
| electrode example 2 | negative electrode | formed | formed | 2100 |
| electrode example 3 | negative electrode | not formed | formed | 1680 |
| electrode example 4 | negative electrode | not formed | formed | 800 |
| electrode example 5 | positive electrode | not formed | formed | 2100 |
| electrode example 6 | positive electrode | formed | formed | 2100 |
| electrode comparative example 1 | negative electrode | not formed | not formed | — |
| electrode comparative example 2 | positive electrode | not formed | not formed | — |

TABLE 2

| | combination of electrodes | | quick charging performance (charging efficiency %) | | | | | capacity after 100 cycles (%) |
|---|---|---|---|---|---|---|---|---|
| | negative electrode | positive electrode | 1 ltA | 5 ltA | 10 ltA | 30 ltA | 100 ltA | |
| battery example 1 | electrode example 1 | electrode comparative example 2 | 100 | 89 | 69 | 42 | 35 | 92 |
| battery example 2 | electrode example 2 | electrode comparative example 2 | 100 | 95 | 91 | 83 | 64 | 97 |
| battery example 3 | electrode example 3 | electrode comparative example 2 | 100 | 86 | 65 | 39 | 28 | 85 |
| battery example 4 | electrode example 4 | electrode comparative example 2 | 100 | 82 | 61 | 32 | 19 | 84 |
| battery example 5 | electrode comparative example 1 | electrode example 5 | 100 | 80 | 52 | 27 | 11 | 99 |
| battery example 6 | electrode example 2 | electrode example 6 | 100 | 100 | 100 | 99 | 98 | 99 |
| battery comparative example 1 | electrode comparative example 1 | electrode comparative example 2 | 100 | 71 | 33 | — | — | 82 |

Seven kinds of batteries of 3.4V-5 Ah having different combinations of electrodes were prepared. After the batteries were initially charged and the capacities thereof were checked, the batteries were discharged till the voltages thereof became 2.0V at a constant current of 1 ltA. Thereafter the batteries were charged at electric currents of 1 ltA, 5 ltA, 10 ltA, 30 ltA, and 100 ltA till the voltages thereof reached a constant voltage of 4.0V to calculate the ratio of a recovery charged capacity to discharge thereof at 1 ltA before they were charged, namely, to calculate the charge efficiencies thereof. In this way, the quick charging performances of the batteries were examined. The batteries were repeatingly charged and discharged at 10 ltA in an atmosphere of −10° C. to measure the transition of the capacities thereof. The capacity retention ratios thereof after 100 charge/discharge cycles finished are shown in table 2. Table 2 shows the obtained quick charging performances of the batteries and the capacity retention ratios thereof.

Table 2 indicates that comparing the performance of the battery of the battery example 1 of the present invention and the battery of the battery comparative example 1 with each other, the battery of the battery comparative example 1 in which the activated carbon was not applied to the positive and negative electrodes had performance equal to that of ordinary batteries and thus cannot be quickly charged at not less than 10 lta.

Comparing the performance of the battery of the electrode comparative example 1 and those of the batteries of the battery examples 1, 2, 3, and 4 with each other, it is apparent that the activated carbon layer used for the electrodes of the batteries of the battery examples 1, 2, 3, and 4 brings about an effect of charging them very quickly at 100 ltA. As the specific surface area of the activated carbon becomes larger, the quick charging performance becomes increasingly high. The activated carbon having a specific surface area not less than 1000 m²/g allows the battery to have very high quick charging performance. It is considered that the activated carbon layer having a smaller specific surface area than the graphite layer acts as a contact resistor, thus making a charging current difficult to flow therethrough as compared with the activated carbon layer having a large specific surface area. Although the activated carbon layer applied to the positive electrode has an effect of improving the quick charging performance to some extent, the effect of the activated carbon layer applied to the positive electrode is not as conspicuous as that of the activated carbon layer applied to the negative electrode. This means that the quick charging performance is mainly determined by the performance of negative electrode.

The effects of the batteries of the battery examples using activated carbons having an equal specific surface area and the following modes were examined: the battery in which the activated carbon layer was applied to only the surface of the negative electrode (battery example 1), the battery in which the activated carbon layer was applied to the surface of the negative electrode, and the current collection foil had through-holes each having a projected portion formed therearound (battery example 2), the battery in which the activated carbon layer was applied to only the surface of the positive electrode (battery example 5), and the battery in which the activated carbon layer was applied to the surface of the positive electrode and that of the negative electrode, and the current collection foil had through-holes each having a projected portion formed therearound (battery example 6). As a result of the examination, the battery of the battery example 6 was most excellent owing to its structure, followed by the battery of the battery example 2, the battery of the battery example 1, and the battery of the battery example 5 in this order. The results indicate the synergistic effect of the application of the activated carbon layer to the electrode and the formation of the through-holes through the current collection foil.

Table 2 indicates that although there is a difference among the performances of the batteries of the battery examples 1 through 6, they are very high in the charge/discharge cycle performance at low temperatures. Table 2 also indicates that the battery (battery comparative example 1) in which the electrode to which the activated carbon layer is applied to neither the positive electrode nor the negative electrode deteriorates in the charge/discharge cycle performance.

As shown in table 2, the electrode or the battery of the present invention can be very quickly charged within one minute at a normal temperature and subjected to charge/discharge cycle performance at low temperatures. It is considered that a large amount of lithium ions which have moved to the surface of the activated carbon layer disposed on the surface of the negative electrode owing to high current charging of the battery are initially adsorbed by the activated carbon layer like a capacitor without the precipitation of metallic lithium and thereafter penetrate between the active substance layer and the carbon material layer owing to its diffusion in solid. Disassembling the battery of the electrode comparative example 1 subjected to charge/discharge cycles and observing the surface of the negative electrode thereof, white crystals were generated on the entire surface of the negative electrode. This is because the metallic lithium precipitated thereon and was converted into lithium carbonate or made a decomposition reaction with an electrolytic solution to generate the lithium carbonate. Further it is considered that owing to the application of the activated carbon layer to the surfaces of the positive and negative electrodes and in addition, owing to the use of the current collection foil having the through-holes each having the projected portion formed therearound, and further owing to the synergistic effect of the application of the activated carbon layer thereto and the formation of the through-holes through the current collection foil, the intercalation and deintercalation reactions of lithium ions are quickly performed at both electrodes in quickly charging the battery.

In the above-described example, the result of the test in which the polyvinyl alcohol binder was used for the activated carbon layer applied to the surface of the negative electrode is shown. Similar results were obtained in the case where a styrene butadiene (SBR) resin binder and a polyacrylic resin binder were used for the activated carbon layer. In the above-described example, lithium iron phosphate was used for the positive electrode and the carbon material was used for the negative electrode. The result of the example was similar to results of the examples in which other lithium oxides were used for the positive electrode and other substances were used for the negative electrode owing to the application of the activated carbon layer to the surface of the active substance layer.

INDUSTRIAL APPLICABILITY

The electrode of the present invention for the lithium secondary battery allows the battery to be very quickly charged and have a high capacity at low temperatures. Further the electrode allows the battery to have improved regenerative performance without increasing the capacity thereof. Therefore the lithium secondary battery of the present invention is always fully charged and can be used for industrial use. For example, the lithium secondary battery can be used for vehicles.

EXPLANATION OF REFERENCE SYMBOLS AND NUMERALS

1a: foil-like current collector
1b: projected portion
1c: projected hole
1d: active substance layer
1e: activated carbon layer

The invention claimed is:

1. An electrode for a lithium secondary battery in which an organic electrolytic solution is permeated into an electrode group formed by winding positive and negative electrodes or by laminating said positive and negative electrodes one upon another with a separator being interposed therebetween to repeatingly occlude and release lithium ions,
wherein said positive electrode is composed of a positive electrode current collection foil and a positive electrode active substance made of olivine type lithium iron phosphate formed on said positive electrode current collection foil; and said negative electrode is composed of a negative electrode current collection foil and a negative electrode active substance formed on said negative electrode current collection foil; and said positive electrode active substance and said negative electrode active substance have at least one phase selected from among a graphene phase and an amorphous phase as a surface layer thereof; and an activated carbon layer having a specific surface area of 1500 $m^2/g$ to 2000 $m^2/g$ and having a thickness of 0.1 to 5 µm is formed on a surface of each of said positive and negative electrode active substance layers.

2. An electrode for a lithium secondary battery according to claim 1, wherein at least one current collection foil selected from among said positive electrode current collection foil and said negative electrode current collection foil has a plurality of through-holes which penetrate through said selected current collection foil and each of which has a projected portion projected from at least one surface of said selected current collection foil.

3. A lithium secondary battery in which said organic electrolytic solution is permeated into said electrode group formed by winding said positive electrode and said negative electrode or by laminating said positive electrode and said negative electrode one upon another with a separator being interposed therebetween to repeatingly occlude and discharge lithium ions, wherein said positive electrode plate and said negative electrode plate are said electrodes for said lithium secondary battery according to claim 1.

4. The lithium secondary battery in which said organic electrolytic solution is permeated into said electrode group formed by winding said positive electrode and said negative electrode or by laminating said positive electrode and said negative electrode one upon another with a separator being interposed therebetween to repeatingly occlude and discharge lithium ions,
wherein said positive electrode plate and said negative electrode plate are said electrodes for said lithium secondary battery according to claim 2.

* * * * *